(No Model.)

J. W. KENYON.
STEAM TRAP.

No. 331,246. Patented Nov. 24, 1885.

Witnesses
H. D. Williams
Edwin S. Coy.

John W. Kenyon.
Inventor
per Alfred Shedlock
Atty.

UNITED STATES PATENT OFFICE.

JOHN W. KENYON, OF BROOKLYN, ASSIGNOR OF ONE-THIRD TO FRANK THOMPSON, OF NEW YORK, N. Y.

STEAM-TRAP.

SPECIFICATION forming part of Letters Patent No. 331,246, dated November 24, 1885.

Application filed September 5, 1885. Serial No. 176,229. (No model.)

*To all whom it may concern:*

Be it known that I, JOHN W. KENYON, a subject of the Queen of Great Britain, residing at Brooklyn, county of Kings, State of New York, have invented certain new and useful Improvements in Steam-Traps, of which the following is a specification.

The steam-trap forming the subject of this application acts entirely by gravity or the weight of the water of condensation, which the appliance is designed to trap or free from any system of steam-pipes or steam-heating apparatus. It has but one moving or working joint, which constitutes the support for the main active portion, and also the governing device, and which allows the escape of the water from the trap without the loss of any steam.

The invention embraces certain novel features of construction by which a steam-trap acting by gravity is made perfectly secure, sensitive in operation, strong and durable, and with a minimum liability of derangement of parts from wear, &c., as will be fully described by reference had to the accompanying drawings, in which—

Figure 1:
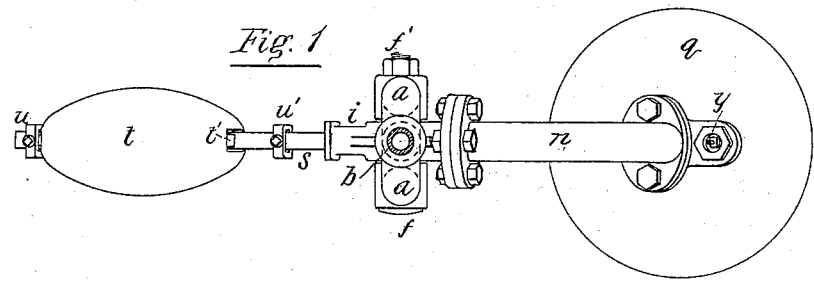
Figure 2:
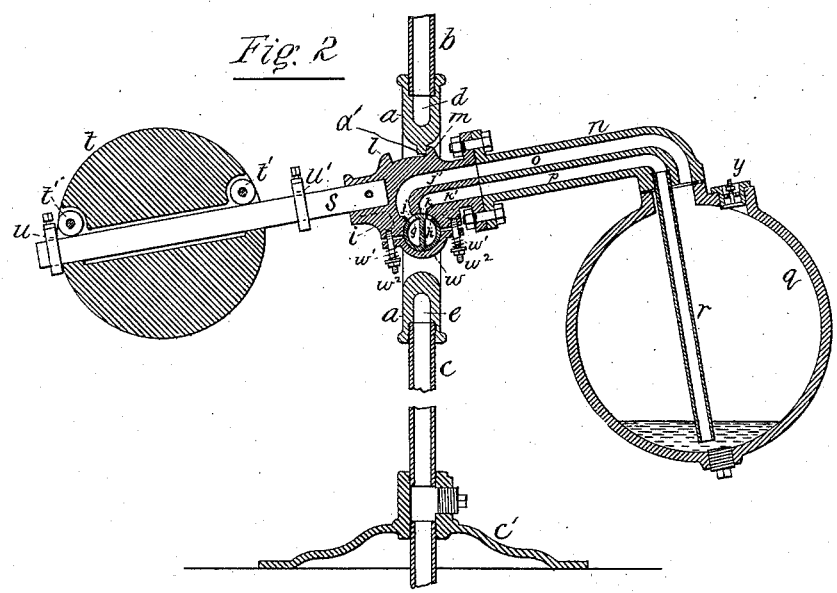
Figure 3:
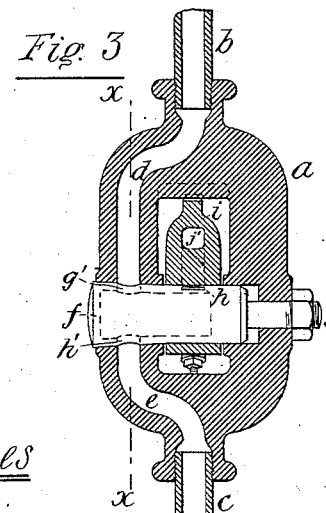
Figure 4:
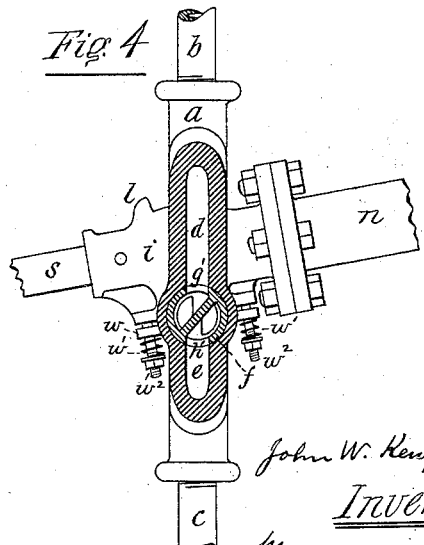

Figure 1 is a plan view of my improved steam-trap. Fig. 2 is a longitudinal vertical section. Fig. 3 is a transverse central section, and Fig. 4 is a section on the line $x\ x$ of Fig. 3.

The main supporting portion of the trap consists of the frame $a$, into the upper end of which is secured the inlet-pipe $b$, and into its lower end is secured the outlet or discharge pipe $c$. Through one side of the frame $a$ is formed the passage $d$, connecting the inlet-pipe $b$ with an opening in this side of the frame, and a passage, $e$, connecting the outlet-pipe $c$ with this said opening, and in this opening is placed the plug $f$, which extends through the frame into its other side, and is provided with a stud, $f'$, passing through this other side of the frame, on which a nut is screwed to hold the plug in position, and draw the end, which is slightly tapering, into the said opening, so as make this juncture of the plug and frame perfectly tight. The part of the plug $f$ between the two sides of the frame $a$ constitutes the journal on which the active device of the trap rocks, and in the upper part of this journal are formed the two ports $g$ and $h$, the interior of the plug $f$ being cored out with two passages, the one connecting the port $g$ with the top opening, $g'$, opposite the inlet-passage $d$, and the other one connecting the port $h$ with the bottom opening, $h'$, opposite the outlet-passage $e$ of the frame $a$. On the journal of the plug $f$ rests the central bearing-piece, $i$, provided with two ports, $j$ and $k$, and passages $j'$ and $k'$, arranged as shown, and two stop-lugs, $l$ and $m$, which lugs, by coming in contact with the flange $a'$ of the frame, limit the rocking movement of the bearing-piece $i$ on the journal. To one end of the piece $i$ is secured the bent arm $n$, having two passages, $o$ and $p$, with their ends respectively opposite the passages $j'$ and $k'$. To the bent end of this arm $n$ is connected the hollow sphere $q$, into which extends nearly to its bottom the pipe $r$, screwed into the end of the passage $p$ and forming a continuation thereof. From the other end of the central bearing-piece, $i$, projects the bar $s$, carrying the counter-weight $t$, which is provided with the rollers $t'$, so as to allow it to slide freely on the bar $s$ between the adjustable stops $u\ u'$, clamped by set-screws on the bar in the desired positions.

To insure the juncture between the journal of plug $f$ and the bearing-piece $i$ always remaining steam-tight under all conditions to which the trap is subjected, the cap $w$ embraces the under side of the journal with a yielding pressure by means of the springs $w'$ $w'$, placed under the nuts of the stud-bolts $w^2$ $w^2$. This yielding spring-cap does not impart undue friction to the bearings, but acts as an auxiliary to the weight of the actuating parts of the trap, which weight, while sufficient to maintain a tight joint between the bearing $i$ and journal-plug $f$ against the pressure of the steam in the trap, would often permit a slight escape of steam when steam was first admitted to the trap, and this is entirely prevented by the application of my spring-cap to the bearing. An ordinary air-valve, $y$, is placed in the water-holder $q$ for the usual purpose. The discharge-pipe $c$ may extend up from a supporting-base, $c'$, as at Fig. 2.

The operation is as follows: When a small quantity of water is in the sphere $q$, the counterpoise $t$ preponderates and brings the moving part of the trap into the position shown in Fig. 2, with the stop-lug $m$ against the web or flange $a'$ of the frame, said weight $t$ resting against the stop $u$ on the bar $s$. In this position the discharge-port $h\ k$ is closed and the inlet-port $g\ j$ opened, and the water of condensation flows through the passage into the hollow sphere $q$ until it nearly fills the same, when the weight of the sphere, with its contained water, equals that of the counterpoise $t$, the sphere gradually falling as the water accumulates therein, and as soon as the bar $s$ assumes a position with its outer end a little above the horizontal the counterpoise $t$ slides down toward the center of motion against the stop $u'$, thereby suddenly reducing its effective weight and allowing the sphere to quickly fall into its lowest position with the stop-lug $l$ against the flange $a'$. The outlet-port $h\ k$ is now fully open, and the inlet-port $g\ j$ remains open, so that the interior of the sphere $q$ is always under the influence of the steam-pressure, which pressure now acts on the surface of the water in the sphere and forces the water up the pipe $r$ through the passages $p\ k'$, outlet-port $h\ k$, and discharge-pipe $c$ back to the boiler, or into a tank, as the case may be. Before all the water is forced out of the sphere $q$—that is, before the lower end of the pipe $r$ is uncovered, as shown in the drawings—the weight of the counterpoise $t$ in its position against the stop $u'$ overbalances the sphere, and it moves suddenly into its more effective position against the stop $u$ as soon as the bar $s$ moves below the horizontal, thus suddenly closing the port $h\ k$ and preventing further escape of water from the trap until it accumulates therein sufficiently to cause it to again operate as before described. It will be observed that by this arrangement the trap will work positively with very little wearing action on the bearing, it quickly and freely assuming the two positions, that escape of steam through the trap is entirely avoided, and that free and clear inlet and outlet passages are provided for the flow of water through the trap.

Having now described my invention, what I claim, and desire to secure by Letters Patent, is—

1. In a steam-trap, in combination, a rocking or oscillating device, a hollow water-holder attached to one side of the same and connected by passages with two ports formed in the journal and bearing, and a loose counterpoise carried freely on a rod projecting from the other side of the rocking device, so as to slide toward the center of oscillation when the weight of the water-holder and its contents preponderates, and slide away from the center when the water-holder has discharged its contents, substantially as and for the purpose set forth.

2. In a steam-trap, in combination, the supporting-frame having inlet and outlet passages, a journal-plug fitted into the frame and having two ports connected to the inlet and outlet passages thereof, and a rocking device supported on the journal-plug, a sliding counterpoise on one side of the bearing and a water-holder on the opposite side, connected by passages to the ports in the journal, substantially as and for the purpose set forth.

3. In a steam-trap, in combination, the supporting-frame $a$, having passages $d\ e$, the plug $f$, having ports $g\ h$ and openings $g'\ h'$, and secured in an opening in the frame, the bearing-piece $i$, provided with ports $j\ k$ and passages $j'\ k'$, the hollow arm $n$ and pipe $r$, the water-holder $q$, the rod $s$, adjustable stops $u\ u'$, and sliding weight $t$, substantially as set forth.

4. In a steam-trap, the combination, with the bearing of the rocking gravity-trap and the water-holder and counterpoise carried thereby, constructed substantially as described, of the cap $w$, and the yielding pressure-springs $w'\ w'$, as and for the purpose set forth.

In testimony whereof I have hereunto set my hand, at New York, county and State of New York, this 24th day of July, 1885.

JOHN W. KENYON.

Witnesses:
  H. D. WILLIAMS,
  ALFRED SHEDLOCK.